United States Patent
Lin et al.

(10) Patent No.: US 11,804,187 B2
(45) Date of Patent: Oct. 31, 2023

(54) DISPLAYS WITH REDUCED COLOR NON-UNIFORMITY

(71) Applicant: Apple Inc., Cupertino, CA (US)

(72) Inventors: Fang-Cheng Lin, San Jose, CA (US); Chengrui Le, Beijing (CN); Yi-Pai Huang, Zhubei (TW); Suraj P Gorkhali, San Jose, CA (US); Tobias Jung, San Francisco, CA (US); He Li, San Jose, CA (US); Yansong Liu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/848,929

(22) Filed: Jun. 24, 2022

(65) Prior Publication Data

US 2022/0415271 A1 Dec. 29, 2022

Related U.S. Application Data

(60) Provisional application No. 63/215,023, filed on Jun. 25, 2021.

(51) Int. Cl.
*G09G 3/34* (2006.01)
*G09G 3/36* (2006.01)

(52) U.S. Cl.
CPC ......... *G09G 3/3413* (2013.01); *G09G 3/3426* (2013.01); *G09G 3/36* (2013.01);
(Continued)

(58) Field of Classification Search
CPC ......... G09G 3/3406–3426; G09G 3/36; G09G 2320/0233; G09G 2320/0242; G09G 2320/0693; G09G 2360/16
See application file for complete search history.

(56) References Cited

U.S. PATENT DOCUMENTS

| 7,898,520 | B2 | 3/2011 | Freier |
| 8,471,807 | B2 * | 6/2013 | Seetzen ............... G09G 3/3426 345/76 |

(Continued)

FOREIGN PATENT DOCUMENTS

CN 102332242 A 1/2012

*Primary Examiner* — Gene W Lee
(74) *Attorney, Agent, or Firm* — Treyz Law Group, P.C.; Kendall P. Woodruff

(57) ABSTRACT

An electronic device may include a display having an array of pixels and a backlight that provides backlight illumination for the array of pixels. The backlight may be a direct-lit backlight with a two-dimensional array of light-emitting diodes operable in a local dimming scheme. The electronic device may include control circuitry that provides pixel signals to the array of pixels and backlight signals to the backlight. The control circuitry may adjust the pixel signals and the backlight signals to compensate for brightness and color non-uniformity in the backlight. To compensate for image-dependent backlight non-uniformity, the control circuitry may simulate artificial backlight data based on the target image to be displayed and stored point spread information. To compensate for white-point-dependent backlight non-uniformity, the control circuitry may use measured actual backlight data that describes color variations across the backlight for a given target white point.

20 Claims, 9 Drawing Sheets

(52) U.S. Cl.
CPC ............... *G09G 2320/0233* (2013.01); *G09G 2320/0242* (2013.01); *G09G 2320/0693* (2013.01); *G09G 2360/16* (2013.01)

(56) References Cited

U.S. PATENT DOCUMENTS

| | | |
|---|---|---|
| 8,482,509 B2 | 7/2013 | Choe et al. |
| 2008/0136770 A1* | 6/2008 | Peker ..................... G09G 3/342 345/102 |
| 2010/0002026 A1* | 1/2010 | Seetzen ................ G09G 3/3426 345/690 |
| 2010/0253882 A1 | 10/2010 | Han et al. |
| 2012/0105503 A1 | 5/2012 | Tada et al. |
| 2012/0154462 A1* | 6/2012 | Hempson ............... G09G 3/342 345/691 |

* cited by examiner

DISPLAYS WITH REDUCED COLOR NON-UNIFORMITY

This application claims the benefit of provisional patent application No. 63/215,023, filed Jun. 25, 2021, which is hereby incorporated by reference herein in its entirety.

FIELD

This relates generally to electronic devices with displays and, more particularly, to displays with backlights.

BACKGROUND

Electronic devices such as computers and cellular telephones have displays. Some displays such organic light-emitting diode displays have arrays of pixels that generate light. In displays of this type, backlighting is not necessary because the pixels themselves produce light. Other displays such as liquid crystal displays include pixels that do not produce light but instead are used to adjust the amount of light transmitted from a backlight through the display.

A backlight may be an edge-lit type backlight or a direct-lit type backlight. In an edge-lit type backlight, one or more light sources emit light into an edge of a light guide plate that distributes the light across the array of pixels. A direct-lit backlight may include an array of light sources that provide light directly to the array of pixels. Direct-lit backlights may be used to implement a local dimming scheme in a display.

If care is not taken, backlights may exhibit brightness and color non-uniformities which can lead to undesirable artifacts in the displayed images.

SUMMARY

A display may have an array of pixels for displaying images for a viewer. The display may be a liquid crystal display having display layers such as a color filter layer, a liquid crystal layer, a thin-film transistor layer, an upper polarizer layer, and a lower polarizer layer.

The pixel array may be illuminated with backlight illumination from a backlight. The backlight may be a direct-lit backlight with a two-dimensional array of light-emitting diodes operable in a local dimming scheme. In other arrangements, the pixel array may be a front-lit pixel array that is illuminated with a front light.

The electronic device may include control circuitry that provides pixel signals to the array of pixels and backlight signals to the backlight. The control circuitry may adjust the pixel signals and the backlight signals to compensate for brightness and color non-uniformity in the backlight. To compensate for image-dependent backlight non-uniformity, the control circuitry may simulate artificial backlight data based on the target image to be displayed and stored point spread function information associated with the array of light-emitting diodes. To compensate for white-point-dependent backlight non-uniformity, the control circuitry may use measured actual backlight data that describes color variations across the backlight for a given target white point. The measured actual backlight data may be gathered during manufacturing and stored in the electronic device.

DETAILED DESCRIPTION

Figure 1:
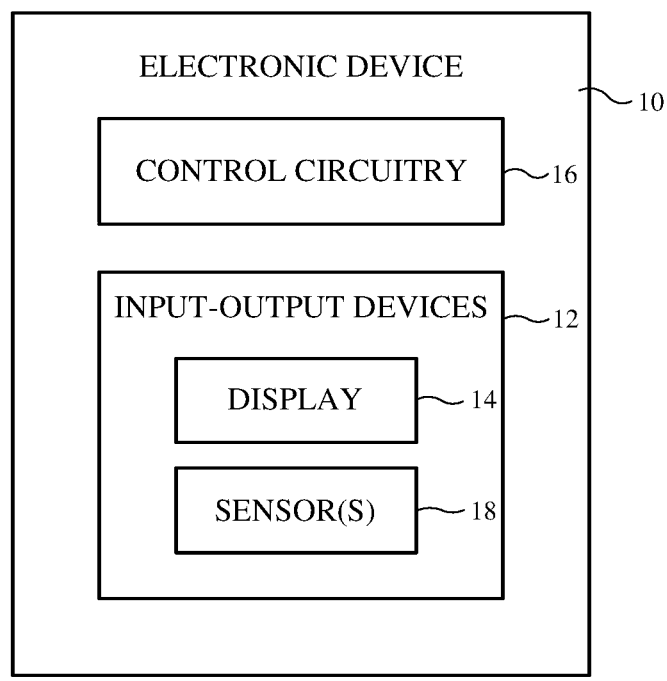
FIG. 1 is a schematic diagram of an illustrative electronic device having a display in accordance with an embodiment.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment. Electronic device 10 may have the shape of a pair of eyeglasses (e.g., supporting frames), may form a housing having a helmet shape, or may have other configurations to help in mounting and securing the components of one or more displays on the head or near the eye of a user.

As shown in FIG. 1, electronic device 10 may include control circuitry 16 for supporting the operation of device 10. Control circuitry 16 may include storage such as hard disk drive storage, nonvolatile memory (e.g., flash memory or other electrically-programmable-read-only memory configured to form a solid-state drive), volatile memory (e.g., static or dynamic random-access memory), etc. Processing circuitry in control circuitry 16 may be used to control the operation of device 10. The processing circuitry may be based on one or more microprocessors, microcontrollers, digital signal processors, baseband processors, power management units, audio chips, application-specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input resources of input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. A touch sensor for display 14 may be formed from electrodes formed on a common display substrate with the display pixels of display 14 or may be formed from a separate touch sensor panel that overlaps the pixels of display 14. If desired, display 14 may be insensitive to touch (i.e., the touch sensor may be omitted). Display 14 in electronic device 10 may be a head-up display that can be viewed without requiring users to look away from a typical viewpoint or may be a head-mounted display that is incorporated into a device that is worn on a user's head. If desired, display 14 may also be a holographic display used to display holograms.

Control circuitry 16 may be used to run software on device 10 such as operating system code and applications. During operation of device 10, the software running on control circuitry 16 may display images on display 14.

Input-output devices 12 may also include one or more sensors 18 such as force sensors (e.g., strain gauges, capacitive force sensors, resistive force sensors, etc.), audio sensors such as microphones, touch and/or proximity sensors such as capacitive sensors (e.g., a two-dimensional capacitive touch sensor associated with a display and/or a touch sensor that forms a button, trackpad, or other input device not associated with a display), and other sensors. In accordance with some embodiments, sensors 18 may include optical sensors such as optical sensors that emit and detect light (e.g., optical proximity sensors such as transreflective optical proximity structures), ultrasonic sensors, and/or other touch and/or proximity sensors, monochromatic and color ambient light sensors, image sensors, fingerprint sensors, temperature sensors, proximity sensors and other sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, and/or other sensors. In some arrangements, device 10 may use sensors 18 and/or other input-output devices to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.).

Display 14 may be a liquid crystal display or may be a display based on other types of display technology (e.g., organic light-emitting diode displays). Device configurations in which display 14 is a liquid crystal display are sometimes described herein as an example. This is, however, merely illustrative. Any suitable type of display may be used, if desired. In general, display 14 may have a rectangular shape (i.e., display 14 may have a rectangular footprint and a rectangular peripheral edge that runs around the rectangular footprint) or may have other suitable shapes. Display 14 may be planar or may have a curved profile.

Figure 2:
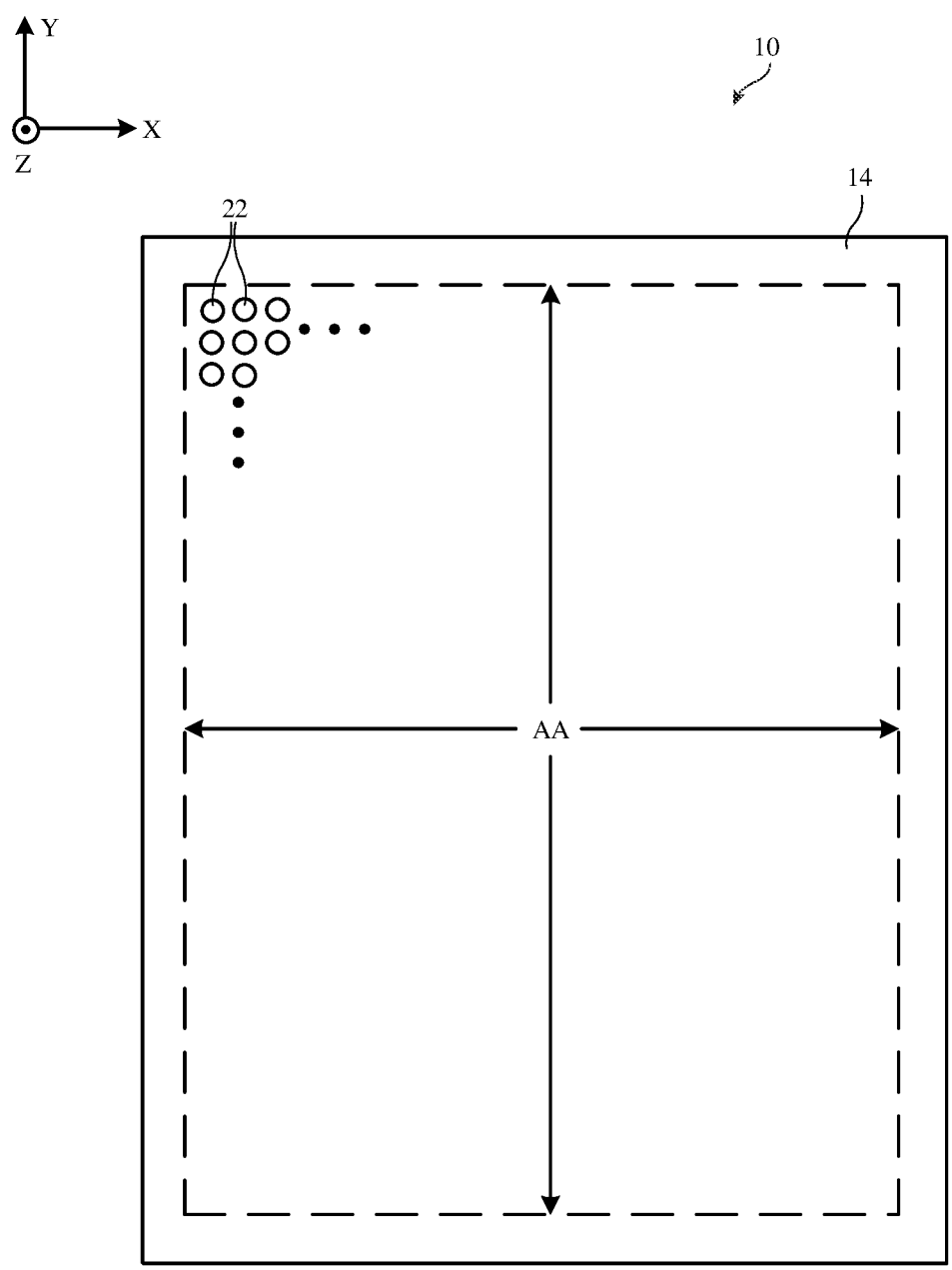
FIG. 2 is a top view of an illustrative display in accordance with an embodiment.

FIG. 2 is a top view of a portion of display 14 showing how display 14 may have an array of pixels 22. Pixels 22 may have color filter elements of different colors such as red color filter elements, green color filter elements, and blue color filter elements. Pixels 22 may be arranged in rows and columns and may form active area AA of display 14. Pixels 22 may be liquid crystal display pixels, if desired. The rectangular shape of display 14 and active area AA in FIG. 2 is merely illustrative. If desired, the active area AA may have a non-rectangular shape (e.g., a shape with one or more curved portions, one or more rounded corners, one or more recesses for accommodating input-output components, etc.).

Figure 3:
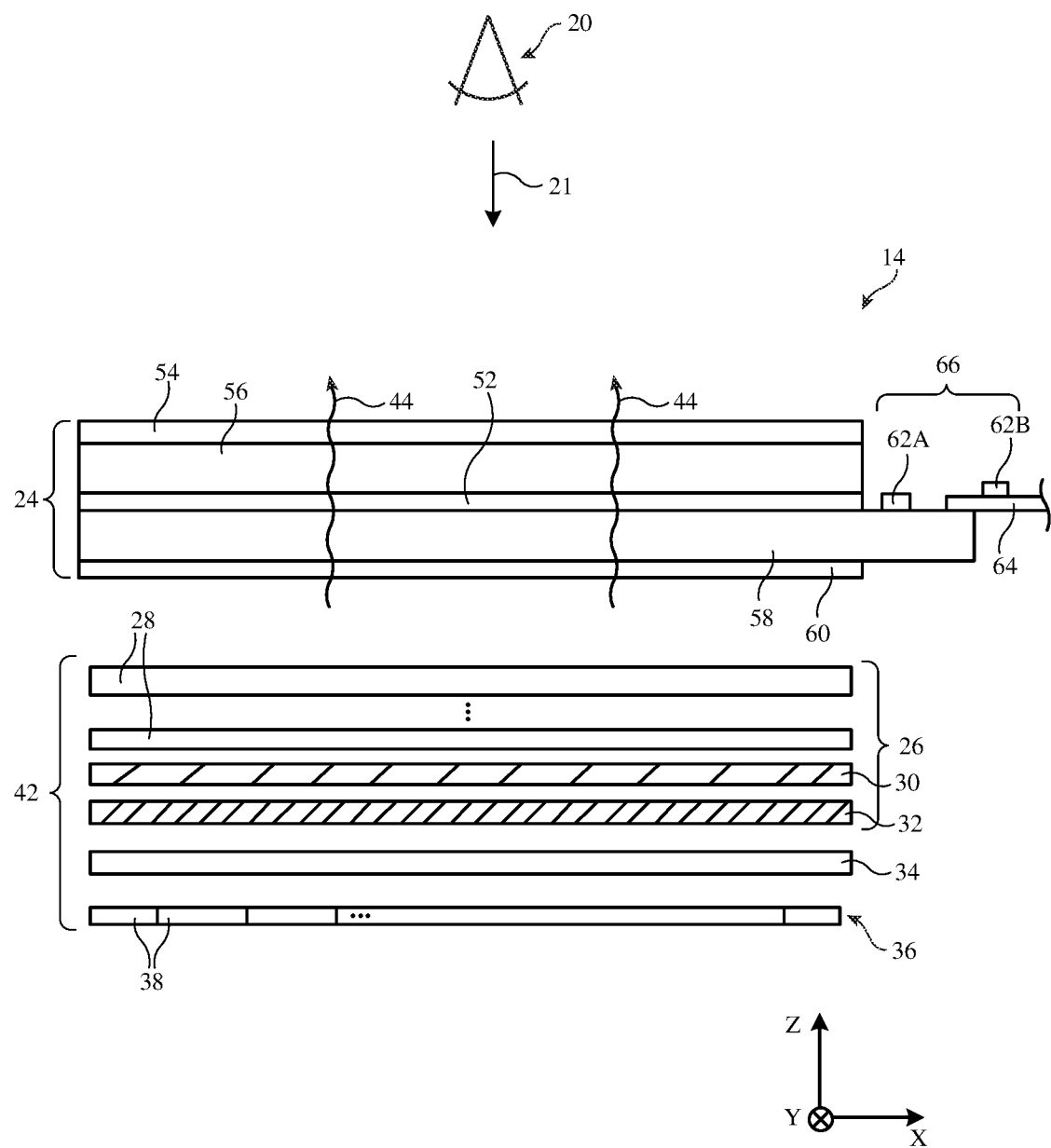
FIG. 3 is a cross-sectional side view of an illustrative display in an electronic device that has a backlight and a pixel array in accordance with an embodiment.

A cross-sectional side view of display 14 is shown in FIG. 3. As shown in FIG. 3, display 14 may include a pixel array such as pixel array 24. Pixel array 24 may include an array of pixels such as pixels 22 of FIG. 2 (e.g., an array of pixels having rows and columns of pixels). Pixel array 24 may include liquid crystal display pixels or other suitable pixel elements.

During operation of display 14, images may be displayed using pixel array 24. Backlight unit 42 (which may sometimes be referred to as a backlight, a direct-lit backlight, backlight layers, backlight structures, a backlight module, a backlight system, etc.) may be used in producing backlight illumination 44 that passes through pixel array 24. This illuminates any images on pixel array 24 for viewing by a viewer such as viewer 20 who is viewing display 14 in direction 21.

Backlight 42 may have optical films 26, a light diffuser such as light diffuser (light diffuser layer) 34, and light-emitting diode array 36. Light-emitting diode array 36 may contain a two-dimensional array of light sources such as light-emitting diodes 38 that produce backlight illumination 44. Light-emitting diodes 38 may, as an example, be arranged in rows and columns and may lie in the X-Y plane of FIG. 3.

The light produced by each light-emitting diode 38 may travel upwardly along dimension Z through light diffuser 34 and optical films 26 before passing through pixel array 24. Light diffuser 34 may contain light-scattering structures that diffuse the light from light-emitting diode array 36 and thereby help provide uniform backlight illumination 44. Optical films 26 may include films such as dichroic filter 32, phosphor layer 30, and films 28. Films 28 may include brightness enhancement films that help to collimate light 44 and thereby enhance the brightness of display 14 for user 20 and/or other optical films (e.g., compensation films, etc.).

Light-emitting diodes 38 may emit light of any suitable color. With one illustrative configuration, light-emitting diodes 38 emit blue light. Dichroic filter layer 32 may be configured to pass blue light from light-emitting diodes 38 while reflecting light at other colors. Blue light from light-emitting diodes 38 may be converted into white light by a photoluminescent material such as phosphor layer 30 (e.g., a layer of white phosphor material or other photoluminescent material that converts blue light into white light). If desired, other photoluminescent materials may be used to convert blue light to light of different colors (e.g., red light, green light, white light, etc.). For example, one layer 30 (which may sometimes be referred to as a photoluminescent layer or color conversion layer) may include quantum dots that convert blue light into red and green light (e.g., to produce white backlight illumination that includes, red, green, and blue components, etc.). Configurations in which light-emitting diodes 38 include red, green, and blue light-emitting diodes and/or light-emitting diodes that emit white light (e.g., so that layer 30 may be omitted, if desired) may also be used.

In configurations in which layer 30 emits white light such as white light produced by phosphorescent material in layer 30, white light that is emitted from layer 30 in the downwards (−Z) direction may be reflected back up through pixel array 24 as backlight illumination by dichroic filter layer 32 (i.e., layer 32 may help reflect backlight outwardly away from array 36). In configurations in which layer 30 includes, for example, red and green quantum dots, dichroic filter 32 may be configured to reflect red and green light from the red and green quantum dots, respectively to help reflect backlight outwardly away from array 36. By placing the photoluminescent material of backlight 42 (e.g., the material of layer 30) above diffuser layer 34, light-emitting diodes 38 may be configured to emit more light towards the edges of the light-emitting diode cells (tiles) of array 36 than at the centers of these cells, thereby helping enhance backlight illumination uniformity. The use of backlight 42 is merely illustrative. If desired, pixel array 24 may be a front-lit pixel array that is illuminated with a front light. Arrangements in which pixel array 24 is illuminated with a backlight are sometimes described herein as an illustrative example.

In a configuration in which pixel array 24 is formed using a liquid crystal display, pixel array 24 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54. Liquid crystal display structures of other types may be used in forming pixel array 24, if desired.

Layers 56 and 58 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of pixel circuits based on thin-film transistors and associated electrodes (pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer. Configurations in which color filter elements are combined with thin-film transistor structures on a common substrate layer may also be used.

During operation of display 14 in device 10, control circuitry 16 (e.g., one or more integrated circuits on a printed circuit) may be used to generate information to be displayed on display 14 (e.g., display data). The information to be displayed may be conveyed to a display driver integrated circuit such as circuit 62A or 62B using a signal path such as a signal path formed from conductive metal traces in a rigid or flexible printed circuit such as printed circuit 64 (as an example). Integrated circuits such as integrated circuit 62A and/or flexible printed circuits such as flexible printed circuit 64 may be attached to substrate 58 in ledge region 66 (as an example).

Figure 4:
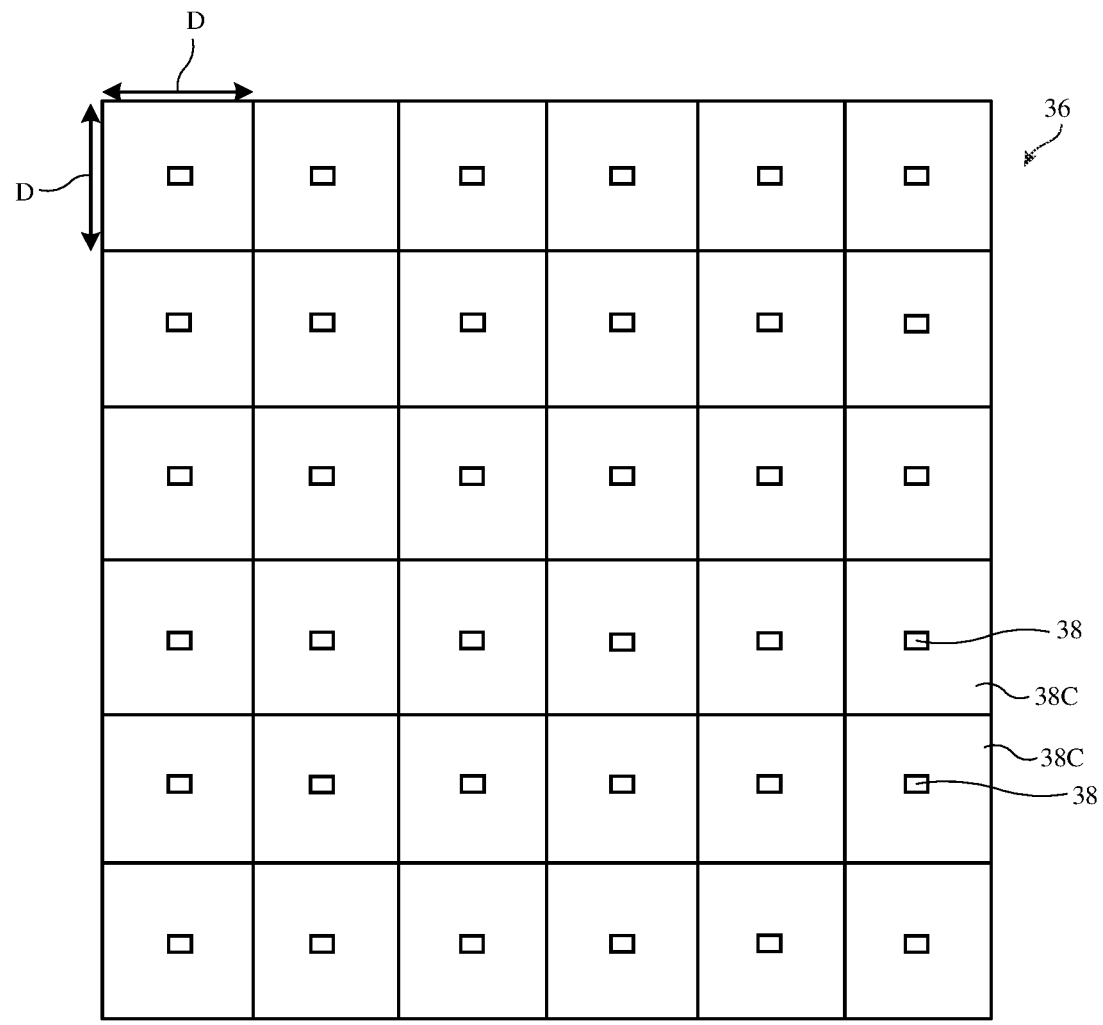
FIG. 4 is a top view of an illustrative backlight having light-emitting diodes arranged in respective cells in accordance with an embodiment.

FIG. 4 is a top view of an illustrative light-emitting diode array for backlight 42. As shown in FIG. 4, light-emitting diode array 36 may contain rows and columns of light-emitting diodes 38. Each light-emitting diode 38 may be associated with a respective cell 38C (sometimes referred to as a tile area, zone, etc.). The length D of the edges of cells 38C may be 2 mm, 18 mm, 1-10 mm, 1-4 mm, 10-30 mm, more than 5 mm, more than 10 mm, more than 15 mm, more than 20 mm, less than 25 mm, less than 20 mm, less than 15 mm, less than 10 mm, or other suitable size. If desired, hexagonally tiled arrays and arrays with light-emitting diodes 38 that are organized in other suitable array patterns may be used. In arrays with rectangular cells, each cell may have sides of equal length (e.g., each cell may have a square outline in which four equal-length cell edges surround a respective light-emitting diode) or each cells may have sides of different lengths (e.g., a non-square rectangular shape). The configuration of FIG. 4 in which light-emitting diode array 36 has rows and columns of square light-emitting diode regions such as cells 38C (e.g., a two-dimensional array of cells 38C) is merely illustrative.

In some cases, each cell 38C may include a single light-emitting diode. Alternatively, each cell 38C may have a light source 38 that is formed form an array of light-emitting diode dies (e.g., multiple individual light-emitting diodes 38 arranged in an array such as a two-by-two group of light-emitting diodes or a three-by-three group of light-emitting diodes in each cell 38C). The multiple diodes in each cell 38C may be mounted on a common substrate, may be mounted on a printed circuit substrate that extends across array 36, may be mounted on a glass substrate that extends across array 36, or may be mounted in array 36 using other desired arrangements. In general, each cell 38C may include a single light-emitting diode, a pair of light-emitting diodes, 2-20 light-emitting diodes, at least 2 light-emitting diodes, at least 4 light-emitting diodes, at least 8 light-emitting diodes, fewer than 5 light-emitting diodes, between 4 and 12 light-emitting diodes, between 8 and 12 light-emitting diodes, between 8 and 10 light-emitting diodes, 9 light-emitting diodes, or other desired number of light-emitting diodes.

Light-emitting diodes 38 may be controlled in unison by control circuitry in device 10 or may be individually controlled. Controlling the light-emitting diodes 38 in unison may be used to provide backlight illumination with uniform brightness across display 14. Controlling the light-emitting diodes individually may enable the electronic device to implement a local dimming scheme that helps improve the dynamic range of images displayed on pixel array 24 and that potentially reduces the power consumption of the backlight. The dynamic range of a display may be considered the ratio between the light of the highest intensity (e.g., the brightest light) that the display is capable of emitting and the light of the lowest intensity (e.g., the dimmest light) that the display is capable of emitting.

Figure 5:
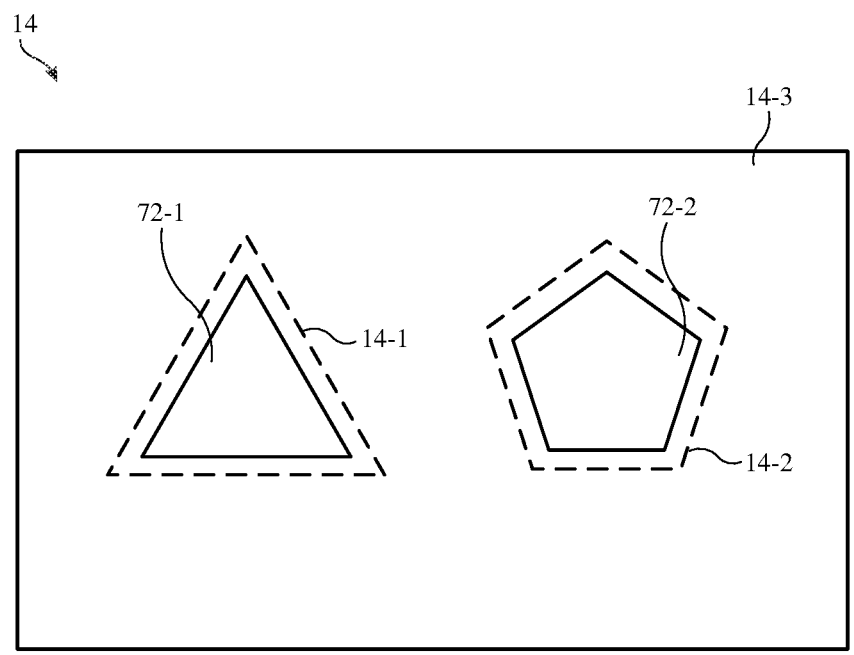
FIG. 5 is a top view of an illustrative display showing how different portions of the display may have different target brightness levels in accordance with an embodiment.

Consider the example depicted in FIG. 5. In FIG. 5, objects such as objects 72-1 and 72-2 are displayed on display 14 (sometimes referred to as screen 14). In this example, object 72-1 may have a high brightness level. Object 72-2 may have an intermediate brightness level. The background of the display may have a low brightness level. If the light-emitting diodes providing backlight for display 14 in FIG. 5 are controlled in unison (e.g., to produce uniform backlight brightness across display 14), all of the light-emitting diodes may be set to a brightness that is optimized for object 72-1. In this scenario, object 72-1 may be displayed with its intended brightness. However, the background of the display is also receiving backlight with a high brightness optimized for object 72-1. Therefore, the background of the display may appear brighter than desired due to display limitations such as light leakage through the pixels or other limitations, and the dynamic range of the display is lower than desired. Alternatively, all of the light-emitting diodes may be set to a brightness that is optimized for the background of the display. In this scenario, the background may be displayed with its intended brightness. However, object 72-1 is also receiving backlight with a low brightness optimized for the background. Therefore, object 72-1 will appear dimmer than desired and the dynamic range of the display will be lower than desired. In yet another embodiment, the brightness of all of the light-emitting diodes may be set to a brightness that is optimized for object 72-2. In this scenario, object 72-1 will appear dimmer than desired and the background will appear brighter than desired.

Additionally, controlling all of the light-emitting diodes in backlight unit 42 in unison may introduce power consumption limitations. The maximum allowable power consumption of the backlight unit may prevent all of the light-emitting diodes from being operated at a peak brightness level. For example, all of the light-emitting diodes may not be able to emit light with a desired brightness for bright object 72-1 while meeting power consumption requirements.

To increase the dynamic range of the display (and to allow for peak brightness levels without exceeding power consumption requirements), the light-emitting diodes in backlight unit 42 may be controlled individually. For example, light-emitting diodes in region 14-1 of the display may have a high brightness optimized for the high brightness of object 72-1, light-emitting diodes in region 14-2 of the display may have a brightness optimized for the intermediate brightness of object 72-2, and light-emitting diodes in region 14-3 of the display may have a low brightness optimized for the low brightness of the background of the display. In one example, the light-emitting diodes in region 14-1 may operate at a maximum brightness whereas the light-emitting diodes in background region 14-3 may be turned off (e.g., operate at a minimum brightness). Varying the brightness of the light-emitting diodes across the display in this manner increases the dynamic range of the display.

Having a two-dimensional array of independently controllable light sources such as light-emitting diodes 38 for producing backlight illumination 44 therefore may increase the dynamic range of the display. Backlights with two-dimensional arrays of light-emitting diodes may sometimes be referred to as two-dimensional backlights. These types of backlights may also sometimes be referred to as direct-lit backlights. The direct-lit backlights emit light vertically towards the pixel array, as opposed to backlights with edge-lit light guide plates (where light is emitted parallel to the plane of the pixel array and redirected vertically towards the pixel array by the light guide plate).

Driving circuitry may be included in display 14 to controlling the light-emitting diodes in backlight 42. Driving circuitry for the light-emitting diodes may be formed from integrated circuits, thin-film transistor circuits, and/or other suitable circuitry. In one example, driving circuitry may be incorporated as thin-film transistor circuitry on a rigid printed circuit board (e.g., a printed circuit board with a plurality of layers of dielectric material such as polyimide and conductive layers). However, the costs associated with such an arrangement may be high, particularly in backlights with a high number of light-emitting diodes. An alternative arrangement for the light-emitting diode driving circuitry is for driver integrated circuits (sometimes referred to as driver integrated circuits) to be included in backlight 42. Each driver integrated circuit may control one or more corresponding light-emitting diodes. In this way, the light-emitting diodes may be controlled to have varying brightness magnitudes across the backlight. The driver integrated circuits may also be used in combination with a glass substrate in one example. In other words, instead of the light-emitting diodes and driver integrated circuits being mounted on a printed circuit board, the light-emitting diodes and driver integrated circuits may be mounted on a glass substrate. The glass substrate may have conductive traces (e.g., copper traces) to allow signals to be transferred between components as necessary.

If care is not taken, backlights may sometimes exhibit color non-uniformity issues that can lead to undesirable artifacts in the displayed images. For example, manufacturing variations among light-emitting diodes 38 may cause brightness and/or color variations in the light emitted across backlight 42. This type of non-uniformity can be compensated for by storing calibration data in device 10 and using the calibration data to adjust pixel values to account for the brightness and/or color variations in backlight 42. For example, one or more point spread functions for each zone of light-emitting diodes 38 in backlight 42 may be stored in device 10. During operation, control circuitry 16 may use this point spread function information to simulate an artificial backlight based on a target image to be displayed. Control circuitry 16 can then adjust pixel values to compensate for the variations in the simulated artificial backlight. However, if the calibration data does not have sufficient resolution (e.g., due to limited memory space), some grid mura may remain in the displayed image.

In addition to manufacturing variations among light-emitting diodes, other aspects of backlight 42 may lead to non-uniformity issues. For example, light-emitting diodes 38 may emit blue light that is converted into white light by a phosphor layer. Light-emitting diodes 38 at the edge of backlight 42 (e.g., along the four sides of backlight 42) may emit a slightly different color than the rest of light-emitting diodes 38 due to a lack of mixing with yellow light from neighboring light-emitting diodes. This can lead to a bluish edge appearing along the four sides of backlight 42. Additionally, non-uniformity in the red and green phosphors of phosphor layer 30 may cause blotchy color mura in backlight 42.

To account for all of the different types of non-uniformity that may arise in backlight 42, control circuitry 16 may compensate pixel signals and/or backlight signals based on simulated artificial backlight data and measured actual backlight data. The simulated artificial backlight data may be used to remove image-dependent variations (e.g., grid mura) that can occur from image-to-image due to manufacturing variations among light-emitting diodes 38. The measured actual backlight data may be used to remove white-point-dependent variations (e.g., bluish edge and blotchy color mura) that can occur for a given target white point due to light-emitting diode location and non-uniformities in phosphor layer 30.

Figure 6:
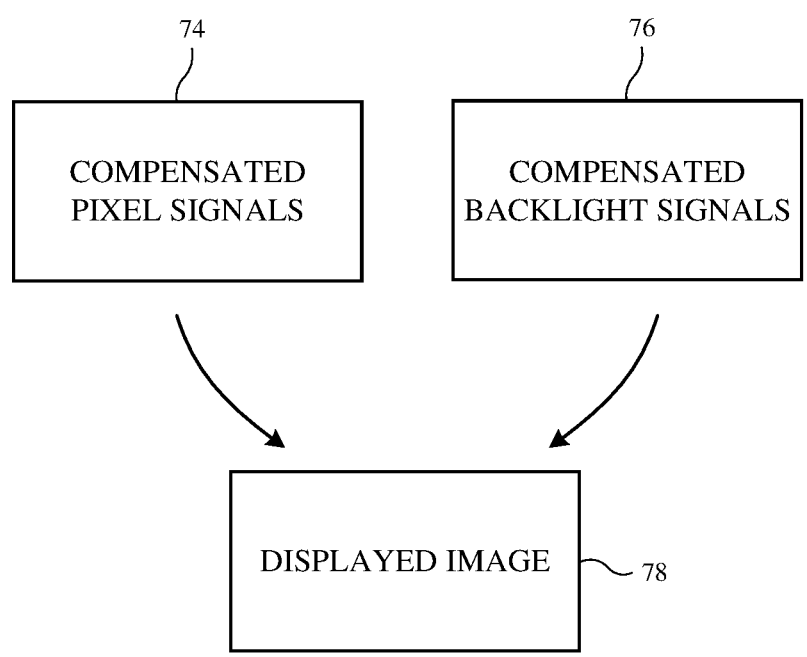
FIG. 6 is a diagram illustrating how compensated pixel signals and compensated backlight signals may be used to display a desired image in accordance with an embodiment.

FIG. 6 is a diagram showing how control circuitry 16 may adjust pixel signals and/or backlight signals to compensate for variations in backlight 42. During operation of display 14, control circuitry 16 may provide compensated pixel signals 74 to pixels 22 and may provide compensated backlight signals 76 to backlight 42 to generate displayed image 78. If desired, pixel signals 74 and backlight signals 76 may be compensated based on simulated artificial backlight data (e.g., a predicted amount of image-dependent backlight non-uniformity) and measured actual backlight (e.g., a measured amount of white-point-dependent backlight non-uniformity).

Figure 7:
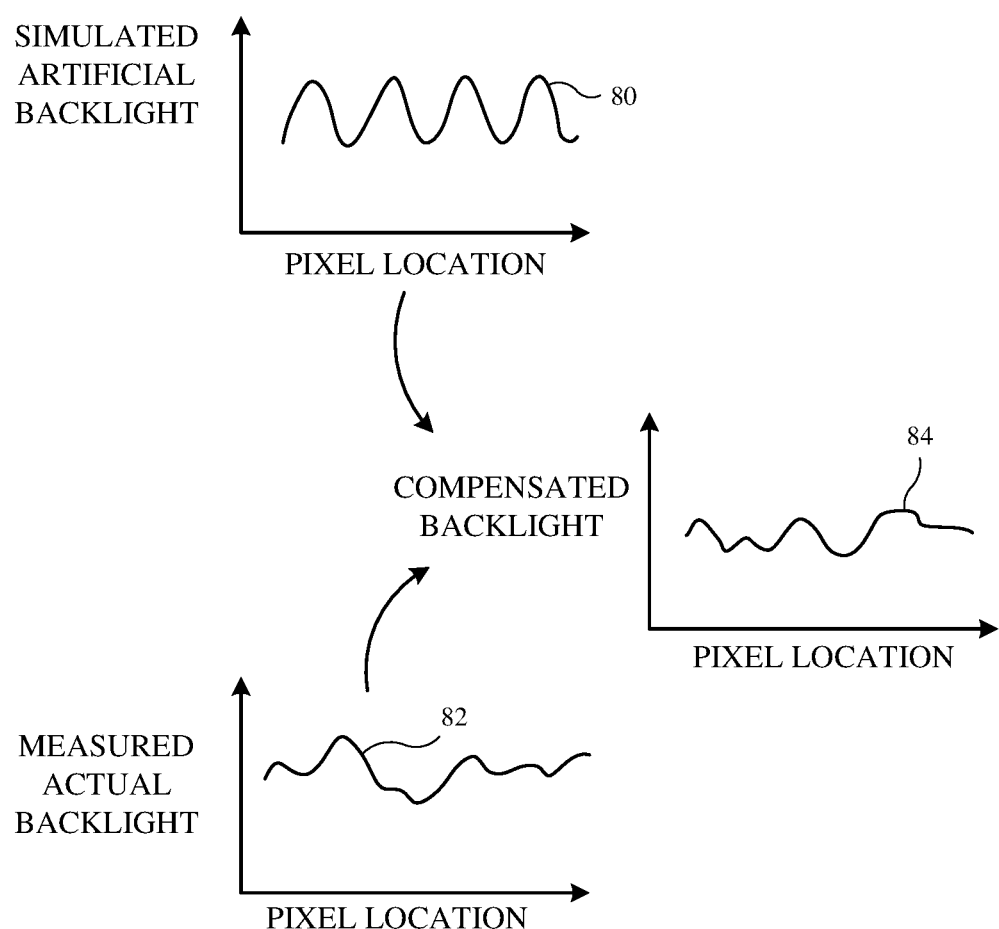
FIG. 7 is a diagram illustrating how simulated artificial backlight data and measured actual backlight data may be used to generate compensated backlight signals in accordance with an embodiment.

FIG. 7 is a diagram showing how simulated artificial backlight data and measured actual backlight data may be combined to generate compensated backlight data (sometimes referred to as compensated backlight signals, compensated backlight brightness and/or color values, etc.). In the graphs shown in FIG. 7, the x-axis represents pixel location (e.g., a pixel location aligned with an associated backlight location), whereas the y-axis may be backlight brightness, may be backlight color, or may be a parameter that expresses both brightness and color (e.g., a ratio of tristimulus vales Z/Y) of backlight 42.

During operation of display 14, control circuitry 16 may receive image data associated with a target image to be displayed. For each new target image, control circuitry 16 may determine an optimal brightness and/or color value for each light-emitting diode 38 in backlight 42 (e.g., to implement a local dimming scheme as described in connection with FIG. 5). Since the optimal brightness and/or color value s for backlight 42 may change from image-to-image, the non-uniformity in backlight 42 that arises from variations among light-emitting diodes 38 (e.g., grid mura) may also change from image-to-image. To account for this changing non-uniformity, control circuitry 16 may simulate (e.g., predict or reconstruct) artificial backlight data 80 for each new target image to be displayed. Simulated backlight data 80 may be generated based on the backlight brightness and/or color value s associated with the target image to be displayed and point spread function information that is stored in device 10. The point spread function information may be calibration data that describes the brightness and/or color spread of each individual light-emitting diode 38 or of each group of light-emitting diodes 38 in a given cell of backlight 42. For example, device 10 may store one or more point spread functions for each cell 38C of light-emitting diodes 38 and/or may store a global mean point spread function for the entire array of light-emitting diodes 38. A point spread function may express the distribution of any suitable variable. For example, a point spread function stored in device 10 may express a distribution of a particular tristimulus value such as X, Y, or Z, may express a distribution of a ratio of tristimulus values (e.g., X/Y, Z/Y, etc.), may express a distribution of luminance values, may express a distribution of chromaticity values, etc. Simulated backlight data 80 may describe how the brightness and/or color of backlight 42 is predicted to vary with pixel location. As shown in FIG. 7, simulated backlight data 80 for a given target image exhibits grid-like variations across the array of pixels 22.

To account for other variations in backlight 42 such as a bluish edge and blotchy color mura, control circuitry 16 may use measured actual backlight data 82 that is stored in device 10. Measured actual backlight data 82 may be stored calibration data that describes how the brightness and/or color of backlight 42 actually varies with pixel location for a given target white point (e.g., D65 or other suitable target white point). As shown in FIG. 7, measured backlight data 82 exhibits brightness and/or color variations across the array of pixels 22.

Control circuitry 16 may combine simulated artificial backlight data 80 and measured actual backlight data 82 to produce compensated backlight data 84. Using artificial backlight data 80 in compensated backlight data 84 removes image-dependent non-uniformities such as grid mura, while using measured actual backlight data 82 in compensated backlight data 84 removes white-point-dependent non-uniformities such as a bluish edge and blotchy color mura. This is, however, merely illustrative. If desired, control circuitry 16 may use only measured actual backlight data 82 and/or simulated artificial backlight data 80 to produce compensated backlight data 84.

If desired, device 10 may store measured actual backlight data 82 for a single white point such as D65, or may store measured actual backlight data 82 for multiple target white points (e.g., D65, D110, etc.). Control circuitry 16 may then select which measured backlight data 82 to use to produce compensated backlight data 84 based on the target white point of display 14.

Figure 8:
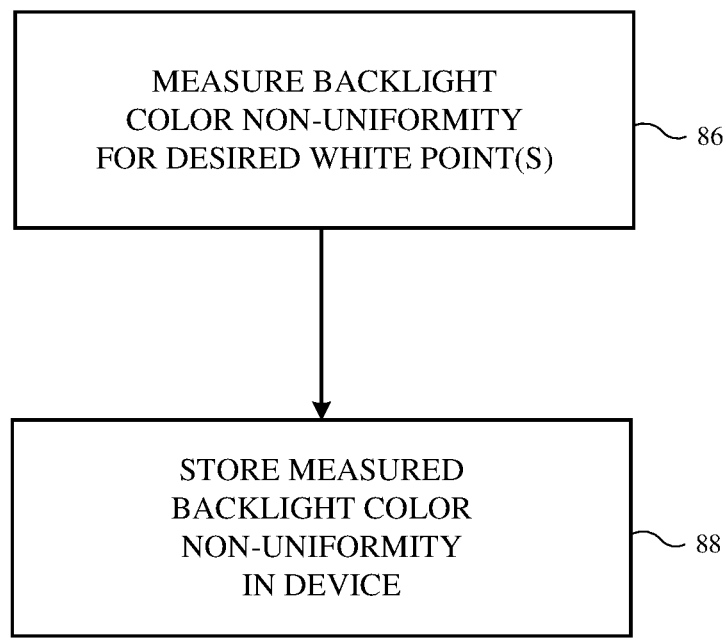
FIG. 8 is a flow chart of illustrative steps involved in gathering backlight calibration data in accordance with an embodiment.

FIG. 8 is a flow chart of illustrative steps involved in gathering and storing calibration data such as measured actual backlight data 82 of FIG. 7.

During the operations of block 86, a calibration system may be used to gather measurements of backlight 42. This may include, for example, turning backlight 42 on to produce a given target white point (e.g., D65, D110, etc.) and using one or more light sensors to measure the brightness and/or color across backlight 42. For example, the measured data may indicate how the brightness and/or color of backlight 42 changes depending on location (e.g., pixel location, light-emitting diode location, etc.). If desired, the calibration system may gather data for multiple target white points during the operations of block 86.

During the operations of block 88, the data measured during the operations of block 86 may be stored in device 10. The stored data (e.g., measured actual backlight data 82 of FIG. 7) may indicate how the color and/or brightness of backlight 42 actually varies with pixel location for a given target white point, which in turn can be compensated for during operation of device 10.

Figure 9:
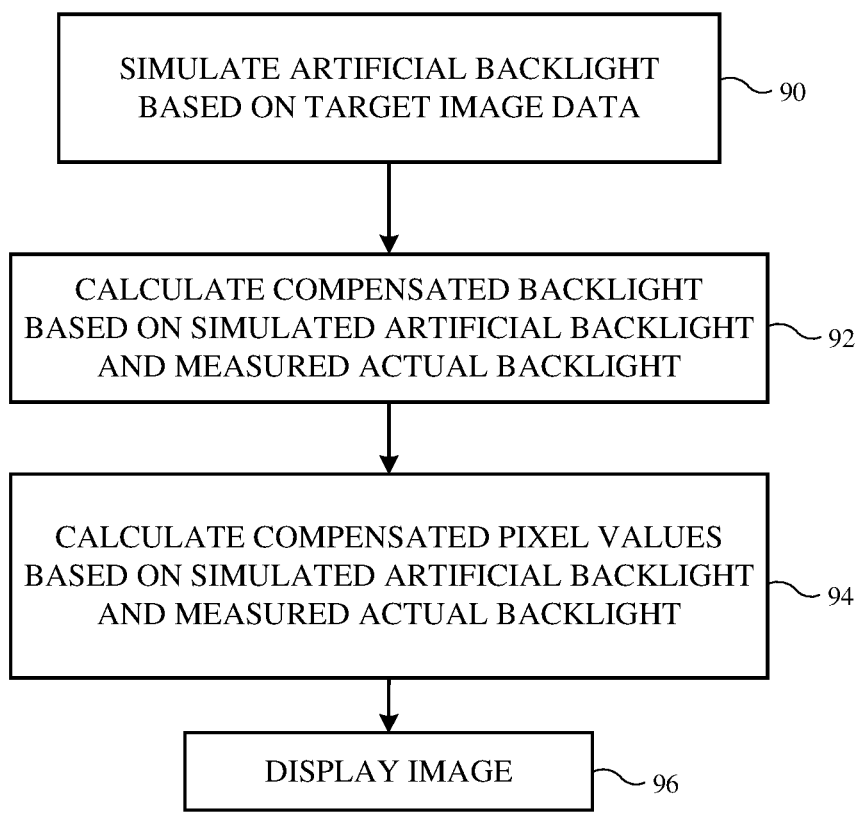
FIG. 9 is a flow chart of illustrative steps involved in displaying an image using compensated backlight signals and compensated pixel signals in accordance with an embodiment.

FIG. 9 is a flow chart of illustrative steps involved in displaying images during operation of device 10.

During the operations of block 90, control circuitry 16 may simulate artificial backlight data 80 based on the target image to be displayed. This may first include determining optimal brightness and/or color value s for each light-emitting diode 38 in backlight 42 based on the target image (e.g., using a local dimming scheme as described in connection with FIG. 5). Based on these optimal brightness and/or color value s, control circuitry 16 may reconstruct (e.g., predict) artificial backlight data 80 using stored point spread function information for light-emitting diodes 38.

During the operations of block 92, control circuitry 16 may combine the artificial backlight data 80 (calculated during the operations of block 90) with the measured actual backlight data 82 (gathered during the calibration operations of FIG. 8 and stored in device 10) to produce compensated backlight signal 84. If different sets of measured actual backlight data 82 corresponding to different target white points are stored in device 10, control circuitry 16 may select which set of measured actual backlight data 82 to use based on the target white point of the displayed image.

During the operations of block 94, control circuitry 16 may determine compensated pixel values for pixels 22 based on the combined artificial backlight data 80 and the measured actual backlight data 82. If desired, control circuitry 16 may compensate pixel values based on the compensated backlight signal 84 after compensated backlight signal 84 is determined in step 92, or control circuitry 16 may use artificial backlight data 80 and measured actual backlight data 82 to compensate both backlight values and pixel values in parallel.

During the operations of block 96, control circuitry 16 may provide compensated pixel values to pixels 22 and compensated backlight values to light-emitting diodes 38 to display the target image.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:
    an array of pixels;
    a backlight having an array of light-emitting diodes that produce backlight illumination for the array of pixels; and
    control circuitry that provides pixel signals to the array of pixels and backlight signals to the backlight, wherein the pixel signals and the backlight signals are adjusted based on simulated artificial backlight data and measured actual backlight data, and wherein the pixel signals and the backlight signals are adjusted to compensate for a predicted backlight non-uniformity.

2. The electronic device defined in claim 1 wherein the control circuitry stores point spread function information for the array of light-emitting diodes.

3. The electronic device defined in claim 2 wherein the control circuitry:
    determines backlight brightness and color values based on a target image to be displayed; and
    calculates the simulated artificial backlight data based on the backlight brightness and color values and the point spread function information.

4. The electronic device defined in claim 3 wherein the point spread function information describes a brightness spread associated with a zone of light-emitting diodes in the array of light-emitting diodes.

5. The electronic device defined in claim 1 wherein the measured actual backlight data indicates an amount of color non-uniformity across the backlight for a given target white point.

6. The electronic device defined in claim 5 wherein the measured actual backlight data is measured during manufacturing and stored in the electronic device.

7. The electronic device defined in claim 1 wherein the predicted backlight non-uniformity comprises image-dependent backlight non-uniformity and wherein the measured actual backlight data compensates for white-point-dependent backlight non-uniformity.

8. The electronic device defined in claim 1 wherein the array of light-emitting diodes comprises blue light-emitting diodes that emit blue light and the backlight comprises a phosphor layer that converts the blue light into white light.

9. The electronic device defined in claim 1 wherein the backlight comprises quantum dots.

10. The electronic device defined in claim 1 wherein the array of light-emitting diodes comprises red, green, and blue light-emitting diodes.

11. An electronic device, comprising:
    a two-dimensional array of pixels;
    a two-dimensional array of light sources that provides backlight illumination for the two-dimensional array of pixels using a local dimming scheme; and
    control circuitry that determines brightness and color values for the two-dimensional array of light sources based on a target image to be displayed, wherein the control circuitry adjusts the brightness and color values to compensate for predicted image-dependent backlight non-uniformity and measured white-point-dependent backlight non-uniformity.

12. The electronic device defined in claim 11 wherein the electronic device stores point spread function information for the two-dimensional array of light sources and stores measured color non-uniformity information for the two-dimensional array of light sources.

13. The electronic device defined in claim 12 wherein the control circuitry simulates artificial backlight data based on the point spread information and the brightness and color values associated with the target image to be displayed and wherein the brightness and color values are adjusted based on the artificial backlight data to compensate for the predicted image-dependent backlight non-uniformity.

14. The electronic device defined in claim 13 wherein the control circuitry adjusts the brightness and color values based on the measured color non-uniformity information to compensate for the measured white-point-dependent backlight non-uniformity.

15. The electronic device defined in claim 11 wherein the control circuitry determines pixel values for the two-dimensional array of pixels based on the target image to be displayed and wherein the control circuitry compensates the pixel values based on the brightness and color values.

16. An electronic device, comprising:
    a display having an array of pixels and an array of light sources that provide illumination for the array of pixels using a local dimming scheme; and
    control circuitry that provides compensated signals to the array of pixels and the array of light sources, wherein the compensated signals are based on a predicted amount of brightness non-uniformity in the illumination and a measured amount of color non-uniformity in the illumination.

17. The electronic device defined in claim 16 wherein the predicted amount of brightness non-uniformity in the illumination is based on a target image to be displayed and stored point spread function information for the array of light sources.

18. The electronic device defined in claim 16 wherein the measured amount of color non-uniformity in the illumination describes color variation across the array of light sources for a given target white point.

19. The electronic device defined in claim 16 wherein the array of light sources comprises blue light-emitting diodes that emit blue light, the electronic device further comprising a phosphor layer that converts the blue light into white light.

20. The electronic device defined in claim 19 wherein the phosphor layer comprises red and green phosphors.

* * * * *